(12) United States Patent
Eyal et al.

(10) Patent No.: US 10,009,430 B2
(45) Date of Patent: Jun. 26, 2018

(54) APPARATUS, SYSTEM AND METHOD OF FINE TIMING MEASUREMENT (FTM)

(71) Applicant: INTEL IP CORPORATION, Santa Clara, CA (US)

(72) Inventors: Elad Eyal, Shoham (IL); Jonathan Segev, Tel Mond (IL); Itai Steiner, Tel Aviv (IL)

(73) Assignee: INTEL IP CORPORATION, Santa Clara, CA (US)

( * ) Notice: Subject to any disclaimer, the term of this patent is extended or adjusted under 35 U.S.C. 154(b) by 108 days.

(21) Appl. No.: 15/086,108

(22) Filed: Mar. 31, 2016

(65) Prior Publication Data

US 2017/0064575 A1  Mar. 2, 2017

Related U.S. Application Data

(60) Provisional application No. 62/210,987, filed on Aug. 27, 2015.

(51) Int. Cl.
*H04W 24/10* (2009.01)
*H04L 12/26* (2006.01)
(Continued)

(52) U.S. Cl.
CPC .......... *H04L 67/18* (2013.01); *H04L 43/0864* (2013.01); *H04W 64/00* (2013.01)

(58) Field of Classification Search
CPC ....... H04W 4/02; H04W 12/04; H04W 12/06; H04W 4/025; H04W 56/001; H04W 56/0065; H04W 72/0406; H04W 84/12; H04W 64/00; G01S 13/767; H04L 43/0864; H04L 67/18
See application file for complete search history.

(56) References Cited

U.S. PATENT DOCUMENTS 8,909,244 B2  12/2014  Curticapean
9,445,227 B2 *  9/2016  Aldana ................. H04W 24/02
(Continued)

FOREIGN PATENT DOCUMENTS

WO  2010129589  11/2010

OTHER PUBLICATIONS

Advisory Action for U.S. Appl. No. 14/127,401, dated Jun. 16, 2016, 9 pages.
(Continued)

*Primary Examiner* — Ahmed Elallam
(74) *Attorney, Agent, or Firm* — Shichrur & Co.

(57) ABSTRACT

Some demonstrative embodiments include apparatuses, systems and/or methods of Fine Timing Measurement (FTM). For example, an apparatus may include circuitry and logic configured to cause an initiator station to process an FTM message received from a responder station, the first FTM message comprising a first field comprising a first Message Authentication Code (MAC); to process a second FTM message comprising the first field, a second field, and an FTM time value corresponding to the first FTM message, the first field comprising a second MAC, and the second field comprising the first MAC; and to determine whether or not to use the FTM time value for an FTM measurement, based on an authentication of the responder station according to the second MAC.

25 Claims, 7 Drawing Sheets

(51) Int. Cl.
    *H04L 29/08* (2006.01)
    *H04W 12/06* (2009.01)
    *H04W 64/00* (2009.01)

(56) References Cited

U.S. PATENT DOCUMENTS

| | | | |
|---|---|---|---|
| 9,459,337 B2* | 10/2016 | Aldana | G01S 5/00 |
| 9,661,603 B2* | 5/2017 | Aldana | H04W 64/00 |
| 9,668,101 B2* | 5/2017 | Marri Sridhar | H04L 5/0055 |
| 9,699,052 B2* | 7/2017 | Aldana | G01S 5/00 |
| 9,736,640 B2* | 8/2017 | Aldana | H04W 4/023 |
| 9,763,046 B2* | 9/2017 | Eyal | H04W 4/023 |
| 9,769,626 B2* | 9/2017 | Bajko | G01S 13/767 |
| 2005/0251401 A1 | 11/2005 | Shuey | |
| 2008/0254833 A1 | 10/2008 | Keevill et al. | |
| 2008/0258973 A1 | 10/2008 | Heidari-Bateni et al. | |
| 2010/0150117 A1 | 6/2010 | Aweya et al. | |
| 2010/0199296 A1 | 8/2010 | Lee et al. | |
| 2011/0320539 A1 | 12/2011 | Zhao et al. | |
| 2012/0182180 A1 | 7/2012 | Wolf et al. | |
| 2012/0210130 A1 | 8/2012 | Buer et al. | |
| 2012/0221853 A1 | 8/2012 | Wingert et al. | |
| 2013/0307723 A1 | 11/2013 | Garin et al. | |
| 2013/0336287 A1 | 12/2013 | Abraham et al. | |
| 2014/0073352 A1 | 3/2014 | Aldana et al. | |
| 2014/0187259 A1 | 7/2014 | Kakani et al. | |
| 2015/0099538 A1* | 4/2015 | Wang | H04W 4/02 455/456.1 |
| 2015/0222602 A1 | 8/2015 | Steiner et al. | |
| 2016/0044524 A1 | 2/2016 | Ben-Haim et al. | |
| 2016/0150500 A1* | 5/2016 | Agrawal | H04W 64/00 370/329 |
| 2016/0157193 A1 | 6/2016 | Qi et al. | |
| 2016/0198317 A1 | 7/2016 | Li et al. | |
| 2016/0234704 A1* | 8/2016 | Aldana | H04L 43/0864 |
| 2016/0241373 A1* | 8/2016 | Marri Sridhar | H04L 5/0055 |
| 2016/0242056 A1 | 8/2016 | Patil et al. | |
| 2017/0261591 A1* | 9/2017 | Zhang | G01S 5/0268 |
| 2017/0324549 A1 | 11/2017 | Abramovsky et al. | |

OTHER PUBLICATIONS

Office Action for U.S. Appl. No. 14/127,401, dated Oct. 6, 2016, 15 pages.
Notice of Allowance for U.S. Appl. No. 14/127,401, dated Apr. 11, 2017, 24 pages.
Office Action for Korean Patent Application No. KR 2016-7004880, dated Dec. 16, 2016, 10 pages (5 pages of English translation).
Supplementary European Search Report for European Application No. 13894595.1, dated May 11, 2017, 8 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
U.S. Appl. No. 15/086,104, filed Mar. 31, 2016, 80 pages.
Office Action for U.S. Appl. No. 14/127,401, dated Aug. 13, 2015, 20 pages.
Office Action for U.S. Appl. No. 14/127,401, dated Mar. 9, 2016, 14 pages.
International Search Report and Written Opinion for PCT/US2013/061539, dated Jun. 16, 2014, 12 pages.
Office Action for U.S. Appl. No. 15/086,104, dated Dec. 23, 2016, 14 pages.

* cited by examiner

APPARATUS, SYSTEM AND METHOD OF FINE TIMING MEASUREMENT (FTM)

CROSS REFERENCE

This application claims the benefit of and priority from U.S. Provisional Patent Application No. 62/210,987 entitled "BACKWARDS-COMPATIBLE TECHNIQUES FOR SECURE LOCATION MEASUREMENT", filed Aug. 27, 2015, the entire disclosure of which is incorporated herein by reference.

TECHNICAL FIELD

Embodiments described herein generally relate Fine Timing Measurement (FTM).

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A Fine Timing Measurement (FTM) may include measuring a Round Trip Time (RTT) from a wireless station (STA) to a plurality of other STAs, for example, to perform trilateration and/or calculate the location of the STA.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
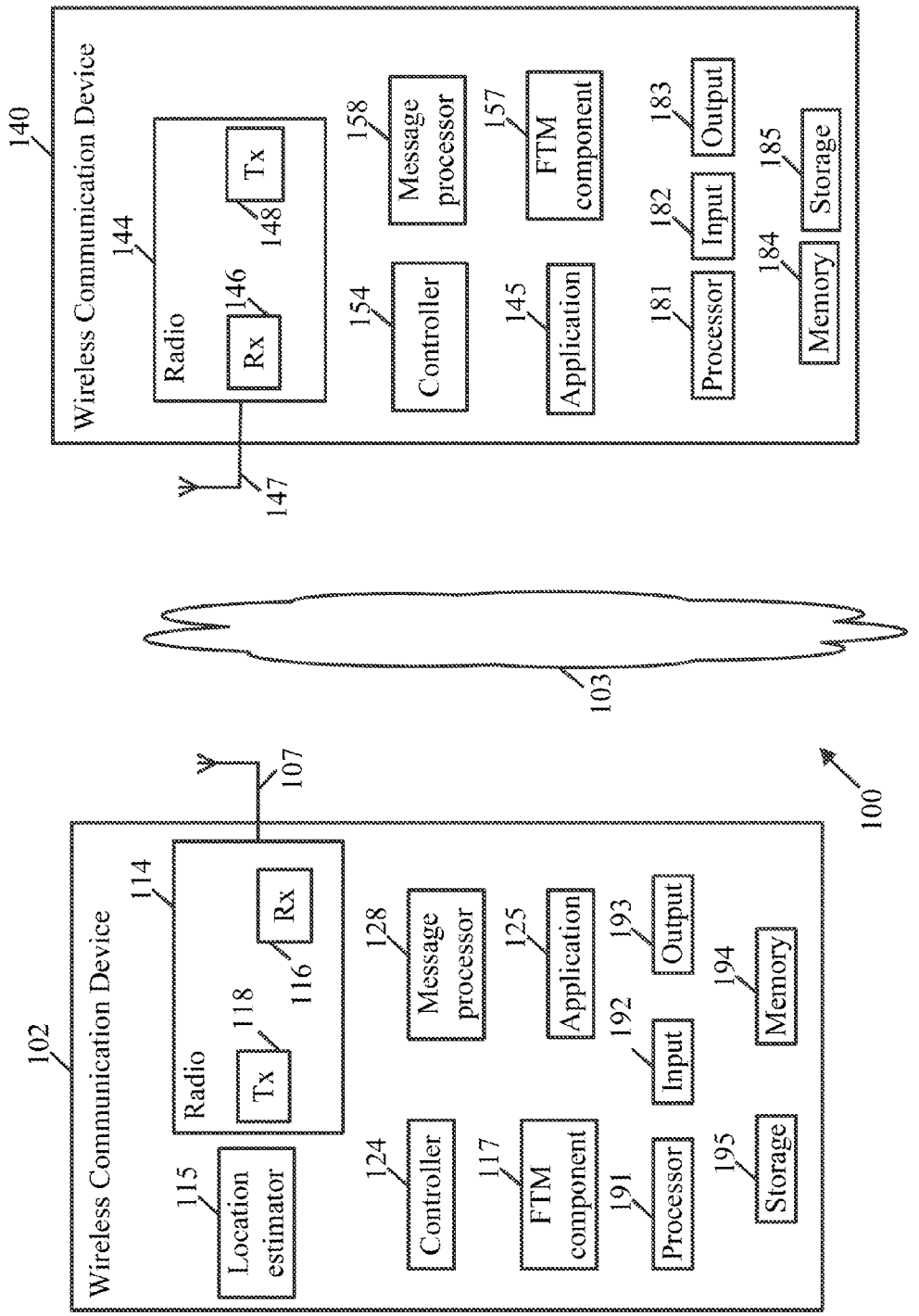
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a sensor device, a wearable device, in Internet of Things (IoT) device, a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012, *IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11*ac*-2013 (*"IEEE P*802.11*ac*-2013, *IEEE Standard for Information Technology—Telecommunications and Information Exchange Between Systems—Local and Metro-* politan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D5.0, January 2016 draft standard for Information technology—Telecommunications and information exchange between systems Local and metropolitan area networks Specific requirements; Part 11: Wireless LAN Medium Access Control (MAC) and Physical Layer (PHY) Specification*"); and/or IEEE 802.11az (*IEEE 802.11az, Next Generation Positioning*)) and/or future versions and/or derivatives thereof, devices and/or networks operating in accordance with existing Wi-Fi Alliance (WFA) Specifications (including *Wi-Fi Neighbor Awareness Networking (NAN) Technical Specification*, Version 1.0, May 1, 2015) and/or future versions and/or derivatives thereof, devices and/or networks operating in accordance with existing WFA Peer-to-Peer (P2P) specifications (including *Wi-Fi P2P technical specification*, version 1.5, Aug. 4, 2014) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification* Version 1.1, April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to Wi-Fi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, one of wireless communication devices 102 and/or 140, e.g., device 102, may perform the functionality of a non-AP STA, and/or one of wireless communication devices 102 and/or 140, e.g., device 140, may perform the functionality of an AP STA. In other embodiments, both devices 102 and 140 may operate as non-AP STAs, and/or as any other STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wi-Fi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, an S1G band, and/or any other frequency band.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at lest one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140. In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a Wi-Fi network.

In other embodiments, wireless communication devices 102 and/or 140 may form, and/or communicate as part of, any other network.

In some demonstrative embodiments, device 102 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordination.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In another example, device 102 may include a mobile device and device 140 may include a responder station, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to estimate a location of device 102, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., Wi-Fi. For example, using Wi-Fi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF) procedure).

In some demonstrative embodiments, the ToF may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may be based on, may be implemented by, or may include one or more operations of, a Fine Timing Measurement (FTM) procedure.

In some demonstrative embodiments, devices 102 and/or 140 may be configured to perform one or more operations and/or communications, for example, according to an FTM procedure and/or protocol, e.g., as described below.

In some demonstrative embodiments, device 102 and/or device 140 may be configured to perform one or more FTM measurements, ToF measurements, positioning measurements and/or communications, ranging measurements and/or communications, proximity measurements and/or communications, location estimation measurements and/or communications, and/or provisioning of location measurements and/or communications of peer devices.

In some demonstrative embodiments, devices 102 and/or 140 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102 and/or 140 may be configured to perform one or more FTM measurements, for example, using WLAN communications, e.g., Wi-Fi. For example, using Wi-Fi to perform time based range measurements, e.g., FTM measurements, may enable, for example, increasing an indoor location accuracy of the mobile devices, e.g., in an indoor environment.

In some demonstrative embodiments, device 102 and/or device 140 may be configured to utilize an FTM Protocol, for example, in accordance with the *IEEE* 802.11*REVmc D5.0 Specification*, and/or any other specification, standard, standard draft and/or protocol. For example, device 102, and/or device 140 may be configured to use the FTM protocol to measure the RTT between devices 102 and 140.

In some demonstrative embodiments, device 102 may include an FTM component 117, and/or device 140 may include an FTM component 157, which may be configured to perform one or more FTM measurements, operations and/or communications, e.g., as described below.

In some demonstrative embodiments, FTM components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of FTM components 117 and/or 157. Additionally or alternatively, one or more functionalities of FTM components 117 and/or 157 may be implemented by logic, which may be executed by a machine and/or one or more processors, e.g., as described below.

In some demonstrative embodiments, FTM component 117 may be configured to perform one or more operations of, and/or at least part of the functionality of, message processor 128 and/or controller 124, for example, to trigger communication of one or more FTM messages, e.g., as described below.

In some demonstrative embodiments, FTM component 157 may be configured to perform one or more operations of, and/or at least part of the functionality of, message processor 158 and/or controller 154, for example, to trigger communication of one or more FTM messages, e.g., as described below.

In some demonstrative embodiments, FTM components 117 and/or 157 may be configured to trigger the FTM measurements, for example, periodically and/or or upon a request from an application executed by a device, for example, to determine an accurate location of the device.

In some demonstrative embodiments, FTM components 117 and/or 157 may be configured to perform one or more measurements according to an FTM protocol, for example, in accordance with an *IEEE* 802.11 *Specification*, e.g., an *IEEE* 802.11*REVmc* Specification and/or any other specification and/or protocol.

In some demonstrative embodiments, FTM components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to an FTM component, e.g., FTM components 117 and/or 157, configured to perform measurements according to an FTM protocol and/or procedure. However, in other embodiments, the FTM component may be configured to perform any other additional or alternative type of Time of Flight (ToF) measurements, ranging measurements, angle measurement, positioning measurements, proximity measurements, and/or location estimation measurements, e.g., according to any additional or alternative protocol and/or procedure.

In some demonstrative embodiments, device 102 may be configured to perform one or more FTM measurements, e.g., between device 102 and device 140, for example, to determine a location of device 102, e.g., as described below.

In some demonstrative embodiments, FTM component 117 may be configured to perform one or more operations of an FTM initiator station to initiate one or more FTM measurements with one or more responder stations, e.g., device 140 and/or any other responder station.

In some demonstrative embodiments, FTM component 157 may be configured to perform one or more operations of an FTM responder station to perform one or more FTM measurements with one or more mobile devices, e.g., device 102.

In some demonstrative embodiments, device 102 may be configured to perform one or more operations of an FTM initiator station to initiate an FTM procedure with a station operating as an FTM responder, for example, device 140, e.g., as described below with reference to FIG. 2.

In some demonstrative embodiments, device 140 may be configured to perform one or more operations of an FTM responder station to perform FTM measurements with a station operating as an FTM initiator station, for example, a mobile device, e.g., device 102, e.g., as described below with reference to FIG. 2.

Figure 2:
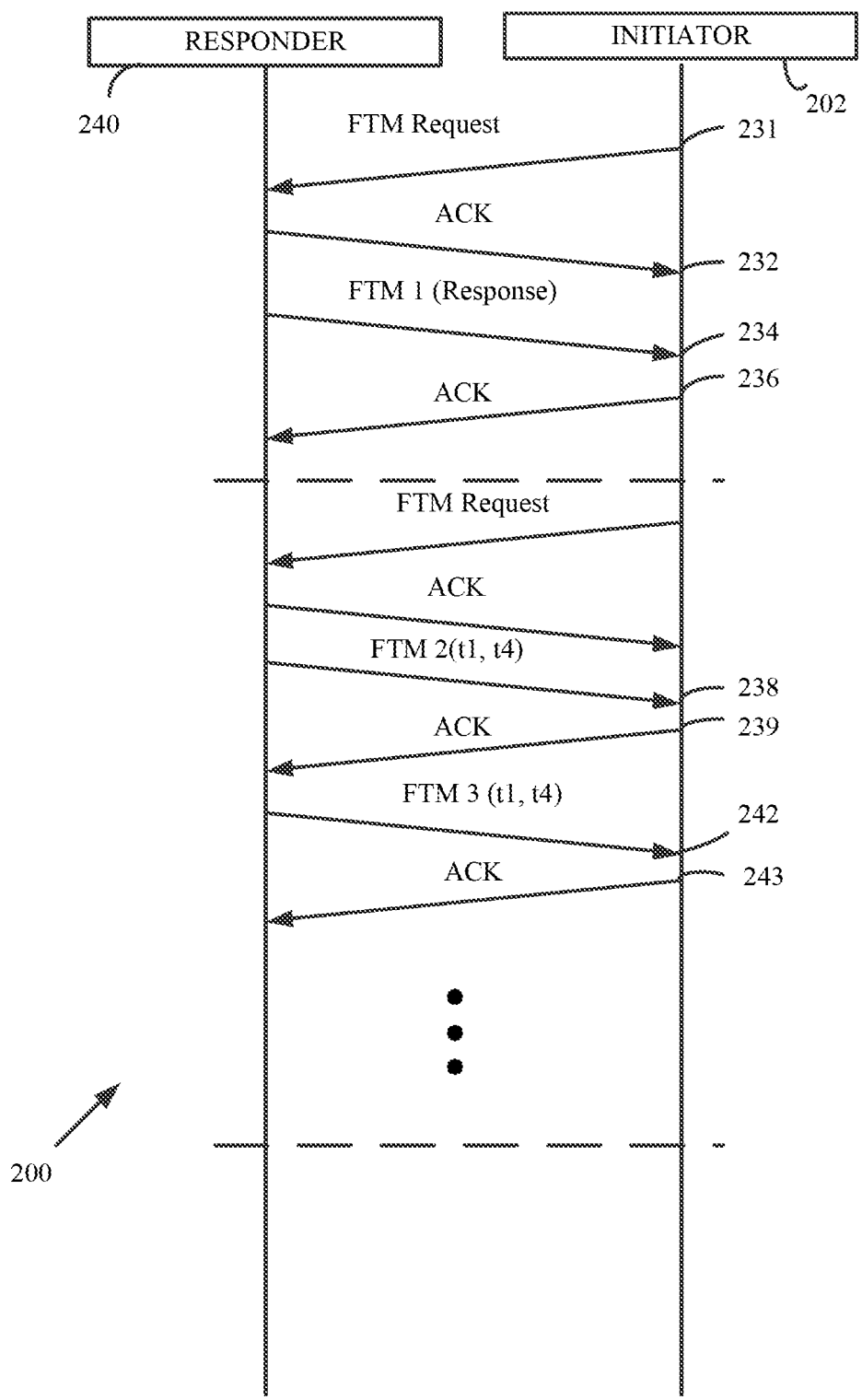
FIG. 2 is a schematic sequence diagram illustration of operations of a Fine Timing Measurement (FTM) procedure between an initiator and a responder, in accordance with some demonstrative embodiments.

Reference is made to FIG. 2, which schematically illustrates a sequence diagram, which demonstrates operations and interactions of an FTM procedure 200 between a first wireless communication device 202 ("Initiating STA", "FTM initiator", or "initiator") and a second wireless communication device 240 ("Responding STA", "FTM responder", or "responder"), in accordance with some demonstrative embodiments. In one example, device 202 may perform the functionality of device 102 (FIG. 1), and/or device 240 may perform the functionality of device 140 (FIG. 1).

As shown in FIG. 2, device 202 may transmit to device 240 an FTM request message 231 to request to perform the FTM procedure 200 with device 240. For example, FTM component 117 (FIG. 1) may trigger, instruct, cause and/or request radio 114 (FIG. 1) to transmit the FTM request message 231, e.g., to device 140 (FIG. 1).

As shown in FIG. 2, device 240 may transmit an FTM request acknowledgement (ACK) 232 to device 202, to acknowledge receipt of the FTM request message 231, and to confirm the request to perform the FTM procedure. For example, FTM component 157 (FIG. 1) may trigger, instruct, cause and/or request radio 144 (FIG. 1) to process transmission of the FTM request ACK message 232 to device 102 (FIG. 1).

As shown in FIG. 2, FTM procedure 200 may include an FTM measurement period, during which devices 202 and 240 may communicate FTM messages, e.g., as described below. For example, FTM component 117 (FIG. 1) may trigger, instruct, cause and/or request radio 114 (FIG. 1) to communicate one or more FTM measurement messages with device 140 (FIG. 1) during the FTM measurement period; and/or FTM component 157 (FIG. 1) may trigger, instruct, cause and/or request radio 144 (FIG. 1) to communicate the one or more FTM measurement messages with device 102 (FIG. 1) during the FTM measurement period, e.g., as described below.

In some demonstrative embodiments, devices 202 and/or 240 may communicate the FTM messages between devices 202 and 240 during the FTM measurement period, for example, to determine a Time of Flight (ToF) value between devices 202 and 240.

In some demonstrative embodiments, as shown in FIG. 2, device 240 may transmit an FTM message 234 to device 202, at a time, denoted t1. The time t1 may be a Time of Departure (ToD), denoted ToD(M), of message 234.

In some demonstrative embodiments, as shown in FIG. 2, device 202 may receive message 234 and may determine a time, denoted t2, e.g., by determining a Time of Arrival (ToA), denoted ToA(M), of message 234. For example, FTM component 117 (FIG. 1) may be configured to trigger, instruct, cause and/or request radio 114 (FIG. 1) to process receipt of message 234, and/or FTM component 117 (FIG. 1) may be configured to determine the ToA of message 234.

In some demonstrative embodiments, as shown in FIG. 2, device 202 may transmit a message 236 to device 240, at a time, denoted t3. Message 236 may include, for example, an acknowledgement message transmitted in response to FTM message 234. The time t3 may be a ToD, denoted ToD (ACK), of the message 236. For example, FTM component 117 (FIG. 1) may be configured to trigger, instruct, cause and/or request radio 114 (FIG. 1) to transmit message 236, and/or FTM component 117 (FIG. 1) may be configured to determine the ToD of message 236.

In some demonstrative embodiments, as shown in FIG. 2, device 240 may receive message 236 and may determine a time, denoted t4, e.g., by determining a ToA, denoted ToA(ACK), of message 236. For example, FTM component 157 (FIG. 1) may be configured to trigger, instruct, cause and/or request radio 144 (FIG. 1) to process receipt of message 236, and/or FTM component 157 (FIG. 1) may be configured to determine the ToA of message 236.

In some demonstrative embodiments, as shown in FIG. 2, device 240 may transmit an FTM message 238 to device 202. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4. For example, FTM component 157 (FIG. 1) may be configured to trigger, instruct, cause and/or request radio 144 (FIG. 1) to transmit message 238.

In some demonstrative embodiments, as shown in FIG. 2, device 202 may receive message 238. For example, FTM component 117 (FIG. 1) may be configured to trigger, instruct, cause and/or request radio 114 (FIG. 1) to process receipt of message 238, and/or FTM component 117 (FIG. 1) may be configured to access, extract and/or process the information corresponding to the time t1 and/or the time t4.

In some demonstrative embodiments, as shown in FIG. 2, device 202 may transmit a message 239 to device 240. Message 239 may include, for example, an acknowledgement message transmitted in response to message 238. For example, FTM component 117 (FIG. 1) may be configured to trigger, instruct, cause and/or request radio 114 (FIG. 1) to transmit message 239.

In some demonstrative embodiments, as shown in FIG. 2, device 240 may transmit an FTM message 242 to device 202. Message 242 may include, for example, information corresponding to the time t1 and/or the time t4 with respect to the messages 238 and/or 239. For example, message 242 may include a timestamp, e.g., a ToD timestamp, including the time t1 corresponding to the message 238, and a timestamp, e.g., a ToA timestamp, including the time t4 corresponding to the message 239. For example, FTM component 157 (FIG. 1) may be configured to trigger, instruct, cause and/or request radio 144 (FIG. 1) to generate and/or transmit message 242.

In some demonstrative embodiments, as shown in FIG. 2, device 202 may receive message 242. For example, FTM component 117 (FIG. 1) may be configured to trigger, instruct, cause and/or request radio 114 (FIG. 1) to process receipt of message 242, and/or FTM component 117 (FIG. 1) may be configured to access, extract and/or process the information corresponding to the time t1 and/or the time t4.

In some demonstrative embodiments, as shown in FIG. 2, device 202 may transmit a message 243 to device 240. Message 243 may include, for example, an acknowledgement message transmitted in response to message 242. For example, FTM component 117 (FIG. 1) may be configured to trigger, instruct, cause and/or request radio 114 (FIG. 1) to transmit message 243.

In some demonstrative embodiments, device 202 may determine a ToF between device 202 and device 240, for example, based on message 238 and/or message 242. For example, FTM component 117 (FIG. 1) may be configured determine the ToF, e.g., as described below.

For example, device 202 may determine the ToF based on an average, or any other function, applied to the time values t1, t2, t3 and t4. For example, device 202 may determine the ToF, e.g., as follows:

$$\text{ToF}=[(t4'-t1')-(t3-t2)]/2 \quad (1)$$

wherein t4' and t1' denote time values, which may be determined by device 202, for example, based on the time values t4 and t1, respectively, For example, device 202 may determine the time values t4' and t1', for example, based on the time values t4 and t1, and a clock offset between devices 202 and 240.

In some demonstrative embodiments, device 202 may determine the distance between devices 202 and 240 based on the calculated ToF.

For example, device 202 may determine the distance, denoted $r_k$, e.g., as follows:

$$r_k=\text{ToF}*C \quad (2)$$

wherein C denotes the radio wave propagation speed.

Referring back to FIG. 1, in some demonstrative embodiments, location estimator 115 may be configured to determine a location of device 102, for example, using a plurality of ranges, e.g., a plurality of ranges corresponding to a plurality of FTM procedures 200 (FIG. 2), from a plurality of other STAs, e.g., by performing trilateration.

Figure 3:
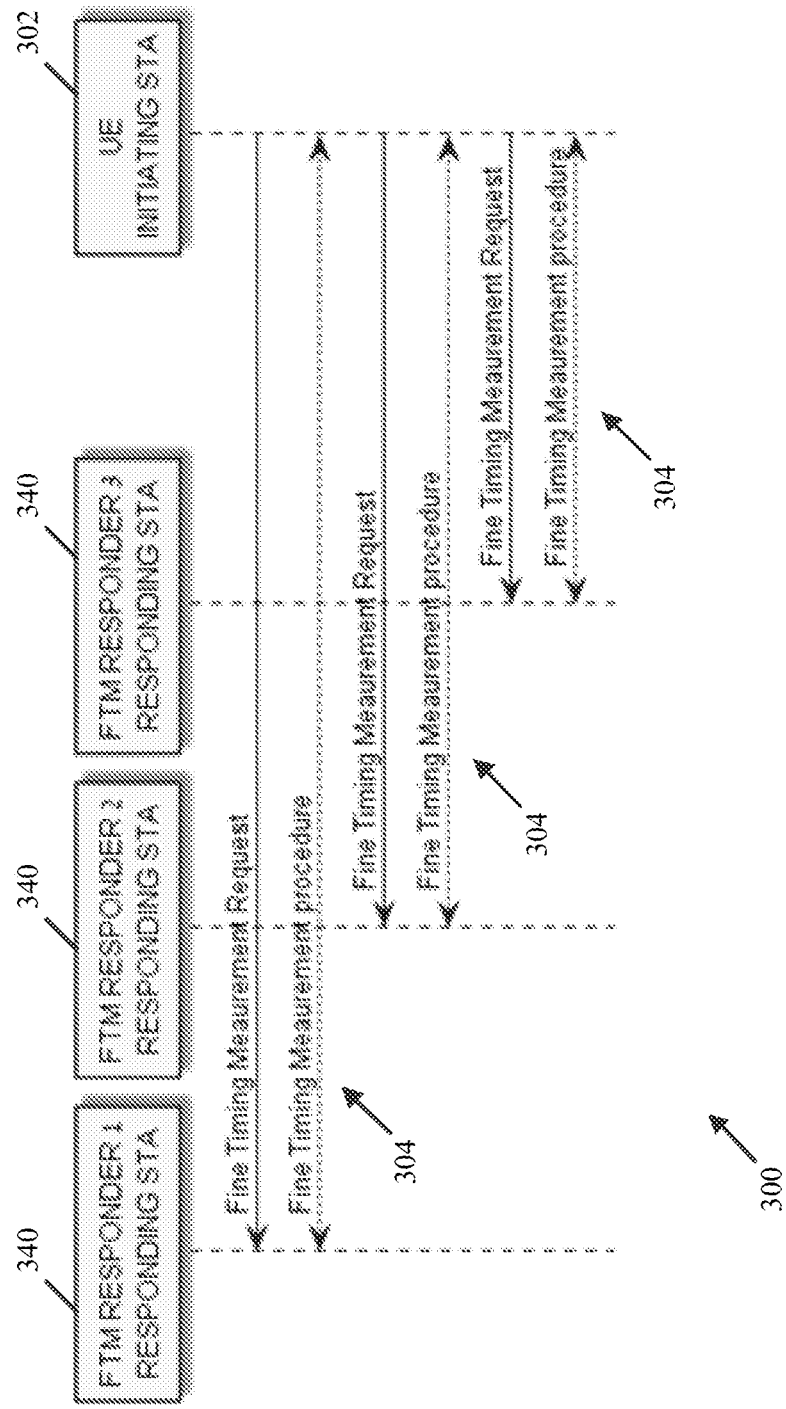
FIG. 3 is a schematic sequence diagram illustration of a location calculation, in accordance with some demonstrative embodiments.

Reference is made to FIG. 3, which schematically illustrates a sequence diagram of a location calculation procedure 300, in accordance with some demonstrative embodiments.

In some demonstrative embodiments, as shown in FIG. 3, an initiator 302 may perform a plurality of FTM procedures 304 with a plurality of responders, e.g., including three responders 340, or any other number of responders.

For example, initiator 302 may perform the functionality of device 102 (FIG. 1), and/or a responder 340 may perform the functionality of device 140 (FIG. 1).

In some demonstrative embodiments, initiator 302 may determine respective ranges from initiator 302 to responders 340, and may perform trilateration, for example, to calculate a location of initiator 302, for example, in accordance with Equation 2 and/or any other calculation, e.g., based on the ranges.

Referring back to FIG. 1, in some demonstrative embodiments, an FTM procedure, e.g., FTM procedure 200 (FIG. 2), and/or a location calculation procedure, e.g., location calculation procedure 300 (FIG. 3), may be used, for example, by an enterprise, for example, for asset tracking, document rights accessibility, and/or the like.

In some demonstrative embodiments, these usages may require a protection, for example, against a possibility of an adversary, e.g., to trick a device into deriving a false location of the device.

In one example, an adversary may perform an "AP spoofing attack" for example, by placing a counterfeit device, which may impersonate to an enterprise-deployed FTM Responder, e.g., by using a Basic Service Set Identifier (BSSID) or a Media Access Control (MAC) address of the enterprise-deployed FTM Responder. According to this example, a false location may be calculated by the mobile device, which may result in bypassing location-based services and/or protection of the enterprise.

In some demonstrative embodiments, devices 102 and/or 140 may be configured to perform operations and/or communications of an FTM protocol, which may be configured to provide one or more benefits, and/or advantages and/or to solve one or more the problems and/or shortcomings of the FTM procedure 200 (FIG. 2), e.g., as described below.

Some demonstrative embodiments may be configured to enhance one or standards and/or protocols, e.g., an IEEE 802.11 Specification, to enable, for example, protection against adversary devices pretending to be enterprise-approved APs, responders, and/or FTM Responders.

Some demonstrative embodiments may provide, for example, a cost effective way to allow an initiator to validate an authenticity of a responder, with which the initiator transacts.

Some demonstrative embodiments may be implemented, for example, to enable an initiator to validate an FTM message from a responder, for example, even without requiring any modification to a procedure, e.g., according to an IEEE 802.11 standard, for example, by using WFA directives and/or certification, or by individual vendors or equipment owners.

Some demonstrative embodiments may be implemented, for example, without a need to affect a behavior of an initiator, e.g., as described below.

In some demonstrative embodiments, a responder may prove its identity to an initiator, for example, by providing a token, e.g., a security token, which may be generated, e.g., only by the responder.

In some demonstrative embodiments, the responder may be configured to utilize a token field, in which a value may be implementation-specific, e.g., in accordance with an IEEE 802.11 standard, for example, to transmit the security token to the initiator, for example, in accordance and/or in compliance with the IEEE 802.11 standard, e.g., as described below.

In some demonstrative embodiments, devices 102 and 140 may utilize FTM messages, which may be in accordance and/or in compliance with the IEEE 802.11 standard, for example, to communicate the security token, e.g., as described below.

In some demonstrative embodiments, FTM component 117 may be configured to control, cause and/or trigger device 102 to transmit an FTM request, e.g., FTM request 231 (FIG. 2), to device 140.

In one example, message processor 128 may generate the FTM request, and/or transmitter 118 may transmit the FTM request to device 140.

In some demonstrative embodiments, the FTM request may be configured to request to perform an FTM procedure, e.g., FTM procedure 200 (FIG. 2), with device 140.

In some demonstrative embodiments, device 140 may receive the FTM request from device 102.

In some demonstrative embodiments, FTM component 157 may be configured to control, cause and/or trigger device 140 to transmit an acknowledgement (Ack) message to device 102, e.g., to acknowledge receipt of the FTM request message.

In some demonstrative embodiments, FTM component 157 may be configured to control, cause and/or trigger device 140 to transmit a first FTM message to device 102, e.g., as described below.

In some demonstrative embodiments, the first FTM message may be in response to the FTM request message.

In some demonstrative embodiments, the first FTM message may include a first field including a first Message Authentication Code (MAC) corresponding to the first FTM message, e.g., as described below.

In some demonstrative embodiments, the first field may include a dialog token field, e.g., as described below.

In some demonstrative embodiments, FTM component 157 may be configured to control, cause and/or trigger device 140 to determine the first MAC, for example, based on one or more parameters, e.g., as described below.

In some demonstrative embodiments, FTM component 157 may be configured to determine the first MAC based at least, for example, on key information, e.g., as described below.

In some demonstrative embodiments, FTM component 157 may be configured to determine the first MAC based at least, for example, on contents of the first FTM message and the key information, e.g., as described below.

In some demonstrative embodiments, FTM component 157 may be configured to determine the first MAC, for example, by applying a cryptographic function, e.g., a hash function and/or any other function, to at least part of the contents of the first FTM message, based at least on the key information, e.g., as described below.

In some demonstrative embodiments, the first MAC message may be configured to protect the integrity and the authenticity of the first FTM message, e.g., by allowing a verifier, e.g., device 102, to verify the data integrity and the authenticity of the first FTM message, e.g., as described below.

In some demonstrative embodiments, FTM component 157 may be configured to control, cause and/or trigger device 140 to determine the first MAC, for example, based on key information including and/or representing at least one key.

In some demonstrative embodiments, the key may include a pre-shared key and/or any other key information shared between devices 102 and 140.

In some demonstrative embodiments, the key may include a key pair including a private key and public key. For example, the first MAC may be determined based on the private key, for example, which may be held by device 140, and the first MAC may be verified and/or authenticated using the public key, for example, which may be held by device 102.

In some demonstrative embodiments, FTM component 157 may be configured to control, cause and/or trigger device 140 to receive the key information, for example, from a certified entity.

In one example, the key information may be issued by a trusted or certified entity, e.g., a certificate authority, to both devices 102 and 140, for example, by a vendor of device 140. In other embodiments, the key information may include any other one or more keys and/or any other key information, which may enable device 102 to authenticate device 140 based on the security token.

In some demonstrative embodiments, FTM component 157 may be configured to control, cause and/or trigger device 140 to determine the first MAC, for example, based on a first time value.

In some demonstrative embodiments, the first time value may be based, for example, on a Time Synchronization Function (TSF). For example, the first time value may be based on a TSF of device 140, a TSF of device 102, and/or any other TSF of any other device, e.g., a NAN cluster TSF.

In some demonstrative embodiments, FTM component 157 may be configured to control, cause and/or trigger device 140 to determine the first MAC, for example, based on an address of device 140.

For example, device 140 may determine the first MAC, for example, based on a media access control address or a BSSID address of device 140. In other embodiments, device 140 may determine the first MAC, for example, based on any other identifier of device 140

In some demonstrative embodiments, FTM component 157 may be configured to control, cause and/or trigger device 140 to determine the first MAC, for example, based on an address of device 102.

For example, device 140 may determine the first MAC, for example, based on a media access control address or a BSSID address of device 102. In other embodiments, device 102 may determine the first MAC, for example, based on any other identifier of device 102.

In some demonstrative embodiments, device 102 may receive from device 140 the first FTM message including the first field including the first MAC, which is based on the key and the first time value, e.g., as described above.

In some demonstrative embodiments, FTM component 117 may be configured to control, cause and/or trigger device 102 to process the FTM message from device 140.

In one example, receiver 116 may receive the FTM message from device 140, and/or message processor 128 may be configured to access, process, and/or decode the FTM message.

In some demonstrative embodiments, FTM component 117 may be configured to control, cause and/or trigger device 102 to authenticate device 140, for example, based on the first MAC in the first FTM message.

For example, FTM component 117 may be configured to control, cause and/or trigger device 102 to determine a MAC value corresponding to the first FTM message, for example, by applying a cryptographic function, e.g., a hash function and/or any other function, to at least part of the contents of the first FTM message, for example, based on shared key information, for example, the shared key, public/private key information, and/or one or more parameters, e.g., as described above. For example, FTM component 117 may be configured to control, cause and/or trigger device 102 to determine the authenticity of device 140, for example, by comparing the calculated MAC value to the first MAC included in the first FTM message.

In some demonstrative embodiments, FTM component 117 may be configured to control, cause and/or trigger device 102 to determine whether or not to perform the FTM measurement with device 140, for example, based on an authentication of the responder station according to the first MAC.

In some demonstrative embodiments, FTM component 117 may be configured to control, cause and/or trigger device 102 to determine whether or not to use location-based information in the first FTM message, for example, based on the authentication of device 140 according to the first MAC.

In some demonstrative embodiments, the location-based information may include, for example, a location configuration information (LCI) report, a CIVIC location report, and/or any other additional or alternative report and/or location-based information.

In one example, FTM component 117 may select to allow device 102 to use the LCI report and/or the CIVIC location report, and may continue the FTM procedure with device 140, for example, only if the authentication of device 140 according to the first MAC in the first FTM is deemed successful.

In another example, FTM component 117 may terminate the FTM procedure with device 140, for example, if the authentication of device 140 according to the first MAC is not successful.

In some demonstrative embodiments, FTM component 117 may be configured to control, cause and/or trigger device 102 to transmit an ACK message, for example, to acknowledge receipt of the first FTM message.

In some demonstrative embodiments, FTM component 157 may be configured to control, cause and/or trigger device 140 to transmit a second FTM message to device 102.

In some demonstrative embodiments, the second FTM message may include the first field and a second field.

In some demonstrative embodiments, the first field may include the dialog token field, and the second field may include a follow-up dialog token field, e.g., as described below.

In some demonstrative embodiments, the first field may include a second MAC.

In some demonstrative embodiments, the second field may include the first MAC, e.g., as received in the first field of the first FTM message.

In some demonstrative embodiments, FTM component 157 may be configured to control, cause and/or trigger device 140 to set the first MAC in the second field of the second FTM message to indicate that the second FTM message follows the first FTM message, and that the second FTM message includes information, e.g., timing information, corresponding to the first FTM message, e.g., as described below.

In some demonstrative embodiments, FTM component 157 may be configured to control, cause and/or trigger device 140 to determine the second MAC, for example, based on one or more parameters, e.g., as described below.

In some demonstrative embodiments, FTM component 157 may be configured to determine the second MAC based at least, for example, on the key information, e.g., as described below.

In some demonstrative embodiments, FTM component 157 may be configured to determine the second MAC based at least, for example, on contents of the second FTM message and the key information, for example the shared key and/or the public/private key information, e.g., as described below.

In some demonstrative embodiments, FTM component 157 may be configured to determine the second MAC, for example, by applying a cryptographic function, e.g., a hash function and/or any other function, to at least part of the contents of the second FTM message, based at least on the key information, e.g., as described below.

In some demonstrative embodiments, the second MAC message may be configured to protect the integrity and the authenticity of the second FTM message, e.g., by allowing a verifier, e.g., device 102, to verify the data integrity and the authenticity of the second FTM message, e.g., as described below.

In some demonstrative embodiments, FTM component 157 may be configured to control, cause and/or trigger device 140 to determine the second MAC, for example, based on the hash function, e.g., the same hash function which may be used to determine the first MAC.

In some demonstrative embodiments, FTM component 157 may be configured to control, cause and/or trigger device 140 to determine the second MAC, for example, based on the key information, e.g., which used to determine the first MAC.

In some demonstrative embodiments, FTM component 157 may be configured to control, cause and/or trigger device 140 to determine the second MAC, for example, based on a second time value.

In some demonstrative embodiments, the second time value may be based, for example, on a TSF, which was used for the first MAC, e.g., the TSF of device 140.

In some demonstrative embodiments, FTM component 157 may be configured to control, cause and/or trigger device 140 to determine the second MAC, for example, based on the address of device 140.

In some demonstrative embodiments, FTM component 157 may be configured to control, cause and/or trigger device 140 to determine the second MAC, for example, based on the address of device 102.

For example, device 140 may determine the second MAC, for example, based on the media access control address or a BSSID address of device 102. In other embodiments, device 140 may determine the second MAC, for example, based on any other identifier of device 102.

In some demonstrative embodiments, FTM component 157 may be configured to generate the second FTM message to include at least one FTM time value corresponding to the first FTM message.

In some demonstrative embodiments, FTM component 157 may be configured to generate the second FTM message to include at least a Time of Departure (ToD) of the first FTM message.

In some demonstrative embodiments, FTM component 157 may be configured to generate the second FTM message to include at least a ToA of an FTM measurement corresponding to the first FTM message.

In some demonstrative embodiments, FTM component 157 may be configured to generate the second FTM message to include at least a value indicating a maximum ToD error of an FTM measurement corresponding to the first FTM message, a value indicating a maximum ToA error of an FTM measurement corresponding to the first FTM message, and/or any other additional or alternative FTM time value.

In some demonstrative embodiments, device 102 may receive from device 140 the second FTM message including the first field including the second MAC, the second field including the first MAC, and/or the at least one FTM time value.

In some demonstrative embodiments, FTM component 117 may be configured to control, cause and/or trigger device 102 to process the second FTM message from device 140.

In one example, receiver 116 may receive the second FTM message from device 140, and/or message processor 128 may be configured to access, process, and/or decode the second FTM message.

In some demonstrative embodiments, FTM component 117 may be configured to control, cause and/or trigger device 102 to transmit an ACK message to device 140, for example, to acknowledge receipt of the second FTM message.

In some demonstrative embodiments, FTM component 117 may be configured to control, cause and/or trigger device 102 to determine that the second FTM message follows the first FTM message and includes timing information of an FTM measurement corresponding to the first FTM message, for example, based on the first MAC in the second field of the second FTM message.

In some demonstrative embodiments, FTM component 117 may be configured to determine that the second FTM message follows the first FTM message and includes timing information of an FTM measurement corresponding to the first FTM message, for example, if a value in the second field of the second FTM message, e.g., the follow-up dialog token field in the second FTM message, is based on, e.g., is identical to, a value in the first field of the first FTM message, e.g., the dialog token field in the first FTM message.

In one example, FTM component 117 may determine that the second FTM message follows the first FTM message and includes timing information of an FTM measurement corresponding to the first FTM message, for example, when a value in the follow-up dialog token field of the second FTM message, matches a value in the dialog token field of the first FTM message. In some demonstrative embodiments, FTM component 117 may be configured to enable device 102 to use the at least one FTM time value in the second FTM message with respect an FTM measurement corresponding to the first FTM message, for example, when the value in the follow-up dialog token field of the second FTM message, matches the value in the dialog token field of the first FTM message In some demonstrative embodiments, FTM component 117 may be configured to control, cause and/or trigger device 102 to determine whether or not to use the at least one FTM time value in the second message FTM for the FTM measurement, for example, based on an authentication of device 140 according to the second MAC.

In some demonstrative embodiments, FTM component 117 may be configured to control, cause and/or trigger device 102 to use the at least one FTM time value in the second FTM message for the FTM measurement, for example, only if the authentication of device 140, e.g., according to the second MAC, is successful.

In some demonstrative embodiments, FTM component 117 may be configured to control, cause and/or trigger device 102 to select not to use the at least one FTM time value in the second FTM message for the FTM measurement, for example, if the authentication of the responder station, e.g., according to the second MAC, is not successful.

In one example, FTM component 117 may be configured to use the key information, which is shared between devices 102 and 140, to determine whether or not device 140 is authenticated, e.g., based on the second MAC included in the second FTM message.

For example, FTM component 117 may be configured to control, cause and/or trigger device 102 to determine a MAC value corresponding to the second FTM message, for example, by applying a cryptographic function, e.g., a hash function and/or any other function, to at least part of the contents of the second FTM message, for example, based on the shared key information and/or one or more parameters, e.g., as described above. For example, FTM component 117 may be configured to control, cause and/or trigger device 102 to determine the authenticity of device 140, for example, by comparing the calculated MAC value to the second MAC included in the second FTM message.

In some demonstrative embodiments, FTM component 117 may be configured to control, cause and/or trigger device 102 to determine a range between devices 102 and 140, for example, based on the FTM measurement, for example, if device 140 is successfully authenticated, e.g., based on the second MAC.

Figure 4:
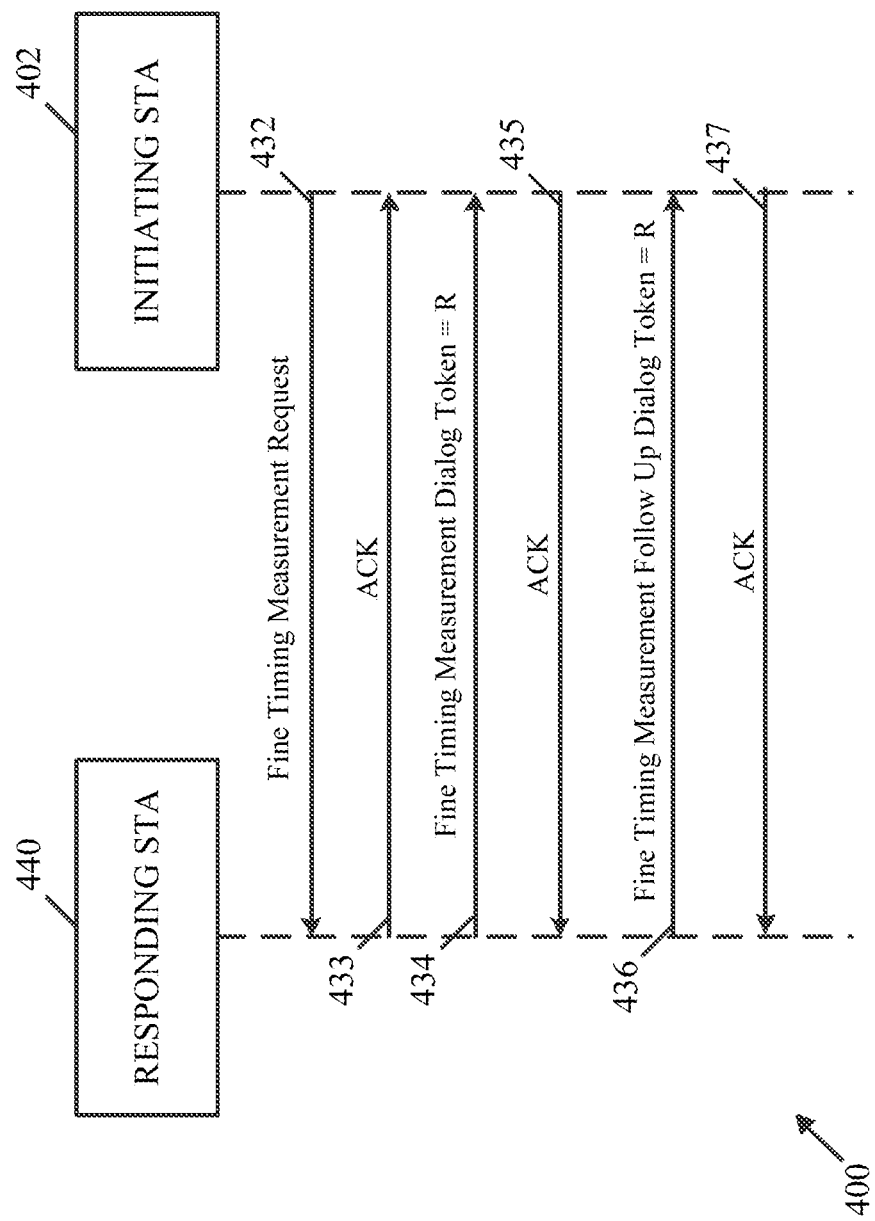
FIG. 4 is a schematic illustration of an FTM procedure, in accordance with some demonstrative embodiments.

Reference is made to FIG. 4, which schematically illustrates an FTM procedure 400, which may enable an initiator 402 to authenticate a responder 440. For example, initiator 402 may perform the functionality of device 102 (FIG. 1), and/or responder 440 may perform the functionality of device 140 (FIG. 1).

In some demonstrative embodiments, as shown in FIG. 4, the initiator 402 may transmit an FTM request message 432 to the responder device 440. For example, device 102 (FIG. 1) may transmit FTM request 432 to device 140 (FIG. 1).

In some demonstrative embodiments, as shown in FIG. 4, the responder device 440 may receive FTM request message 432 from the initiator 402.

In some demonstrative embodiments, as shown in FIG. 4, the responder device 440 may transmit an Ack message 433 to the initiator 402, e.g., to acknowledge receipt of FTM request 432. For example, device 140 (FIG. 1) may transmit Ack message 435 to device 102 (FIG. 1).

In some demonstrative embodiments, as shown in FIG. 4, the responder device 440 may transmit a first FTM message 434 to the initiator 402. For example, device 140 (FIG. 1) may transmit FTM message 434 to device 102 (FIG. 1).

In some demonstrative embodiments, as shown in FIG. 4, FTM message 434 may include a token value, denoted R, e.g., in a dialog token field.

In some demonstrative embodiments, the value of R may be determined by responder 440 and may be used to indicate a relationship between messages of FTM procedure 400, e.g., between first FTM message 434 and a second FTM message 436.

In some demonstrative embodiments, by carefully selecting a value of R, responder 440 may provide information to initiator 402, for example, to prove that the responder 440 is authentic.

In some demonstrative embodiments, the responder 400 may determine the value of R to include a MAC corresponding to the message 434, e.g., as described above.

In some demonstrative embodiments, the value of R may be generated by the responder 440, and may be validated by the initiator 402, for example, if the initiator 402 and responder 440 both have access to one or more shared information elements.

In some demonstrative embodiments, one or more elements, e.g., some or all, may be included in a cryptographic process, for example, to provide a soundproof authenticity of responder 440, e.g., as described below.

In some demonstrative embodiments, the elements may include a common secret, e.g., issued by a trustworthy entity. The common secret may be a key, which may be sent beforehand to the initiator 402 and the responder 440, or the common secret may be a part of a private/public key pair, such that one STA of initiator 402 and responder 440, holds the private key and the other STA holds the public key, e.g., as described above.

In some demonstrative embodiments, the one or more shared information elements may include a MAC Address of the responder 440 and/or any other address or identifier of responder 440, e.g., as described above.

In some demonstrative embodiments, it may be very difficult for an adversary to pretend to be the responder 440, for example, if both the MAC Address of responder 440, and the value of R are transmitted on the same message, e.g., messages 434 and/or 436, for example, while the value of R is determined based on the MAC Address of responder 440.

In some demonstrative embodiments, the one or more shared elements may include a time-based value, e.g., a value derived from a TSF, as described above. In one example, the time-based value may enable, for example, to mitigate and/or prevent replay attacks from an adversary.

In some demonstrative embodiments, the one or more shared elements may include a MAC Address of the initiator 402, or any other form of identification of the initiator 402, e.g., as described above.

In some demonstrative embodiments, the MAC Address of the Initiator 402 may not be required, for example, if the shared key information or secret, which is shared between the initiator 402 and the responder 440 is unique to the initiator 402.

For example, the MAC Addresses of the initiator 402 may not be used in the cryptographic algorithm, for example, if every initiator, e.g., a UE, has a unique private/public key pair.

In some demonstrative embodiments, the responder 440 may combine some or all of the shared elements described above, and may cryptographically hash the elements, e.g., as described above.

In some demonstrative embodiments, the responder 440 may be configured to use an 8-bit hash value and/or any other hash value, e.g., a result of the cryptographic function, as an initial value for R.

In some demonstrative embodiments, as shown in FIG. 4, the initiator 402 may transmit an Ack message 435 to responder 440, e.g., to acknowledge receipt of the first FTM message 434. For example, device 102 (FIG. 1) may transmit Ack message 435 to device 140 (FIG. 1).

In some demonstrative embodiments, as shown in FIG. 4, the responder device 440 may transmit the second FTM message 436 to the initiator 402. For example, device 140 (FIG. 1) may transmit FTM message 436 to device 102 (FIG. 1).

In some demonstrative embodiments, as shown in FIG. 4, FTM message 436 may include the token value R in a follow up dialog token field, for example, to indicate a relationship between FTM messages 434 and 436, e.g., as described above.

In some demonstrative embodiments, as shown in FIG. 4, the initiator 402 may transmit an Ack message 437 to responder 440, e.g., to acknowledge receipt of the second FTM message 436. For example, device 102 (FIG. 1) may transmit Ack message 437 to device 140 (FIG. 1).

In some demonstrative embodiments, in some use cases, at least three responders, e.g., three responders 440, may be required, for example, to perform trilateration, e.g., in order to determine a location of an initiator. In other embodiments, any other number of responders may be used.

In some demonstrative embodiments, a sole adversary, who pretends to be a responder, may brute force its way to R. However, the sole adversary may not be able to create much damage, for example, since other responders may be authentic, and, accordingly, an error introduced by the adversary may be detected by the initiator 402.

In some demonstrative embodiments, in order to attack a location calculation procedure of an initiator, the adversary may deploy multiple fake Responders, which may need to consistently provide correct values for R. However, the initiator 402 may minimize a chance for false positive to the minimum for example, by performing an FTM Procedure multiple times and with multiple responders.

In some demonstrative embodiments, when initiator 402 detects a fake responder, the initiator 402 may ignore information from the responder; may blacklist the responder and may ignore future information from the fake responder; may select other nearby responders for an FTM procedure; may notify, for example, a central security server; and/or may perform one or more additional or alternative operations.

Figure 5:
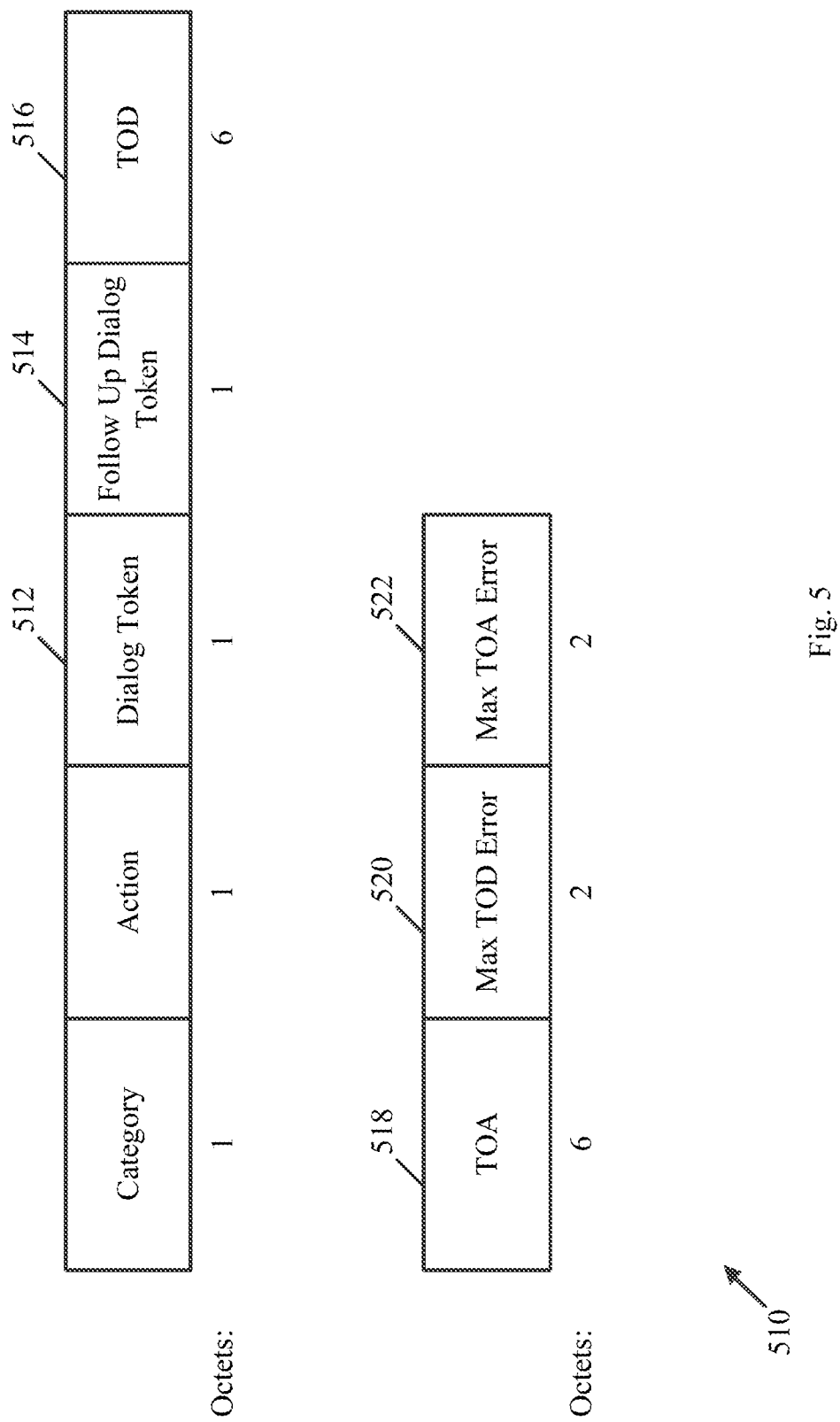
FIG. 5 is a schematic illustration of a structure of an FTM message, in accordance with some demonstrative embodiments.

Reference is made to FIG. 5, which schematically illustrates a format of an FTM message 510, in accordance with some demonstrative embodiments.

In some demonstrative embodiments, FTM message 510 may include an FTM frame format, which may be, for example, in compliance with an IEEE 802.11 standard.

In some demonstrative embodiments, as shown in FIG. 5, FTM message 510 may include a dialog token field 512 and/or a follow-up dialog token field 514.

In some demonstrative embodiments, dialog Token field 512 may include a nonzero value, which may be chosen by a sender of the FTM message 510, for example, to identify a first FTM message with a second or a follow-up FTM message to be sent later, e.g., to identify the first FTM message as a first of a pair of FTM messages including the first and the follow-up FTM messages.

In one example, FTM component 157 (FIG. 1) may control, cause and/or trigger device 140 (FIG. 1) to transmit the first FTM message including the first MAC in the Dialog Token field 512. For example, an initiator device, e.g., device 102 (FIG. 1), may identify the first FTM message as a first of a pair, e.g., including the first FTM message and a second FTM message, for example, when the first FTM message includes a non-zero value, e.g., the first MAC.

In some demonstrative embodiments, dialog Token field 512 may be set to zero, for example, to indicate that a Timing Measurement frame, e.g., FTM message 510, will not be followed by a subsequent follow-up FTM message.

In some demonstrative embodiments, the Follow Up Dialog Token field 514 of the second FTM message may include, for example, the nonzero value of the Dialog Token field 512 of a previously transmitted FTM message, e.g., the first FTM message, and. Accordingly, may indicate that the second FTM message is a follow up Timing Measurement frame of the first FTM message.

For example, FTM component 157 (FIG. 1) may control, cause and/or trigger device 140 (FIG. 1) to transmit the second FTM message including the first MAC in the follow-up Dialog Token field 514. For example, an initiator device, e.g., device 102 (FIG. 1), may identify the second FTM message as a follow-up to the first FTM message, e.g., based on a match between the first MAC included in the Dialog Token field 512, and the first MAC included in the follow-up Dialog Token field 514.

In some demonstrative embodiments, as shown in FIG. 5, FTM message 510 may include one or more FTM time values, e.g., a ToD field 516 to include a ToD value, a ToA field 518 to include a ToA value, a Max ToD error field 520 to include a maximal ToD error value, and/or a Max ToA error field 522 to include a maximal ToA error value.

In some demonstrative embodiments, an initiator, e.g., device 102, receiving FTM frame 510 may be configured to determine that one or more of the FTM time values in fields 516, 518, 520, and/or 522 of the received FTM frame are to be used with respect to an FTM measurement corresponding to a previously received FTM frame, for example, if the value in follow up dialog token field 514 of the FTM frame 510 matches a value in the dialog token field 512 of the previously received FTM frame.

Figure 6:
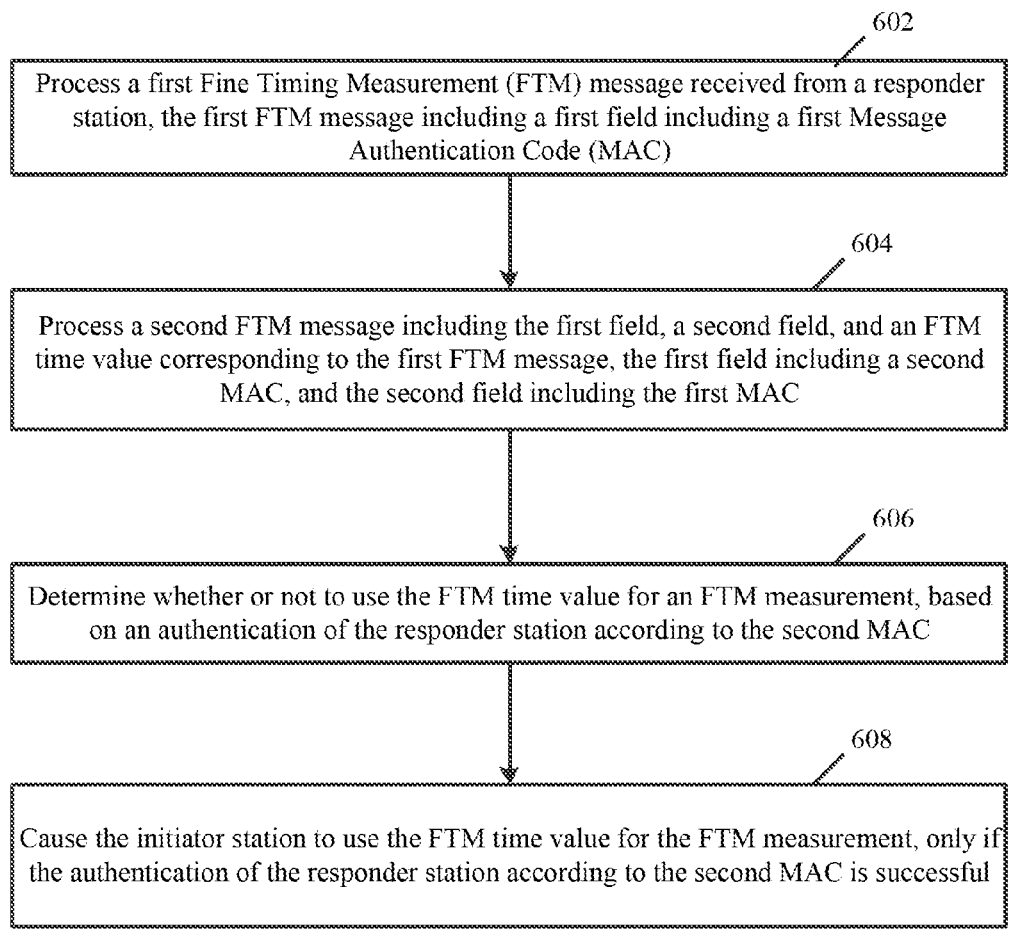
FIG. 6 is a schematic flow-chart illustration of a method of FTM, in accordance with some demonstrative embodiments.

Reference is made to FIG. 6, which schematically illustrates a method of FTM, in accordance with some demonstrative embodiments. For example, one or more of the operations of the method of FIG. 6 may be performed by a wireless communication system, e.g., system 100 (FIG. 1); a wireless communication device, e.g., devices 102 and/or 140 (FIG. 1); a controller, e.g., controllers 124 and/or 154 (FIG. 1); an FTM component, e.g., FTM components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1), a transmitter, e.g., transmitters 118 and/or 148 (FIG. 1); and/or a receiver, e.g., receivers 116 and/or 146 (FIG. 1).

As indicated at block 602, the method may include processing a first FTM message received from a responder station, the first FTM message including a first field including a first Message Authentication Code (MAC). For example, FTM component 117 (FIG. 1) may control, cause and/or trigger device 102 (FIG. 1) to process the first FTM message from device 140 (FIG. 1) including the first field including the first MAC, e.g., as described above.

As indicated at block 604, the method may include processing a second FTM message including the first field, a second field, and at least one FTM time value corresponding to the first FTM message. The first field may include a second MAC, and the second field may include the first MAC. For example, FTM component 117 (FIG. 1) may control, cause and/or trigger device 102 (FIG. 1) to process the second FTM message from device 140 (FIG. 1) including the first field including a second MAC, the second field including the First MAC, and the at least one FTM time value, e.g., as described above.

As indicated at block 606, the method may include determining whether or not to use the FTM time value for an FTM measurement, based on an authentication of the responder station according to the second MAC. For example, FTM component 117 (FIG. 1) may determine whether or not to use the FTM time value for an FTM measurement, based on an authentication of device 140 (FIG. 1) according to the second MAC, e.g., as described above.

As indicated at block 608, the method may include causing the initiator station to use the FTM time value for the FTM measurement, only if the authentication of the responder station according to the second MAC is successful. For example, FTM component 117 (FIG. 1) may control, cause and/or trigger device 102 (FIG. 1) to use the FTM time value for the FTM measurement, only if the authentication of device 140 (FIG. 1) according to the second MAC is successful, e.g., as described above.

Figure 7:
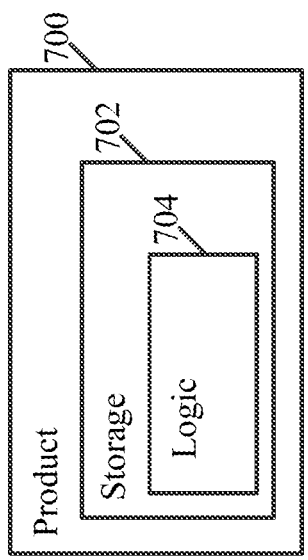
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), FTM components 117 and/or 157 (FIG. 1), location estimator 115 (FIG. 1), and/or to perform one or more operations descried above with reference to FIGS. 1, 2, 3, 4, 5, and/or 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause an initiator station to process a first Fine Timing measurement (FTM) message received from a responder station, the first FTM message comprising a first field comprising a first Message Authentication Code (MAC); process a second FTM message comprising the first field, a second field, and an FTM time value corresponding to the first FTM message, the first field comprising a second MAC, and the second field comprising the first MAC; and determine whether or not to use the FTM time value for an FTM measurement, based on an authentication of the responder station according to the second MAC.

Example 2 includes the subject matter of Example 1, and optionally, wherein the apparatus is configured to cause the initiator station to determine whether or not to use location based information in the first FTM message, based on an authentication of the responder station according to the first MAC.

Example 3 includes the subject matter of Example 2, and optionally, wherein the location based information comprises at least one report selected from a group consisting of a location configuration information (LCI) report, and a CIVIC location report.

Example 4 includes the subject matter of any one of Examples 1-3, and optionally, wherein the apparatus is configured to cause the initiator station to determine whether or not to perform the FTM measurement, based on an authentication of the responder station according to the first MAC.

Example 5 includes the subject matter of any one of Examples 1-4, and optionally, wherein the apparatus is configured to cause the initiator station to use the FTM time value for the FTM measurement only if the authentication of the responder station according to the second MAC is successful.

Example 6 includes the subject matter of any one of Examples 1-5, and optionally, wherein the apparatus is configured to cause the initiator station to select not to use the FTM time value for the FTM measurement if the authentication of the responder station according to the second MAC is not successful.

Example 7 includes the subject matter of any one of Examples 1-6, and optionally, wherein the first MAC is based on a key and a first time value, and the second MAC is based on the key and a second time value.

Example 8 includes the subject matter of Example 7, and optionally, wherein the first and second time values are based on a Time Synchronization Function (TSF).

Example 9 includes the subject matter of Example 7 or 8, and optionally, wherein the key comprises a pre-shared key shared between the initiator station and the responder station.

Example 10 includes the subject matter of any one of Examples 7-9, and optionally, wherein the apparatus is configured to cause the initiator station to receive the key from a certified entity.

Example 11 includes the subject matter of any one of Examples 1-10, and optionally, wherein the second MAC is based on an address of the responder station.

Example 12 includes the subject matter of Example 11, and optionally, wherein the second MAC is based on an address of the initiator station.

Example 13 includes the subject matter of any one of Examples 1-12, and optionally, wherein the first MAC and the second MAC are based on a hash function.

Example 14 includes the subject matter of any one of Examples 1-13, and optionally, wherein the apparatus is configured to cause the initiator station to determine, based on the first MAC in the second field of the second FTM message, that the second FTM message follows the first FTM message.

Example 15 includes the subject matter of any one of Examples 1-14, and optionally, wherein the first field comprises a dialog token field, and the second field comprises a follow-up dialog token field.

Example 16 includes the subject matter of any one of Examples 1-15, and optionally, wherein the FTM time value comprises a Time of Departure (ToD) of the first FTM message.

Example 17 includes the subject matter of any one of Examples 1-16, and optionally, wherein the apparatus is configured to cause the initiator station to transmit an FTM request message to the responder station, the first FTM message is in response to the FTM request message.

Example 18 includes the subject matter of any one of Examples 1-17, and optionally, wherein the apparatus is configured to cause the initiator station to transmit an acknowledge (Ack) message to the responder station to acknowledge receipt of the first FTM message or the second FTM message.

Example 19 includes the subject matter of any one of Examples 1-18, and optionally, wherein the apparatus is configured to cause the initiator station to determine a range between the initiator station and the responder station, based on the FTM measurement.

Example 20 includes the subject matter of any one of Examples 1-19, and optionally, comprising a radio to receive the first and second FTM messages.

Example 21 includes the subject matter of any one of Examples 1-20, and optionally, comprising one or more antennas, a memory, and a processor.

Example 22 includes a system of wireless communication comprising an initiator station, the initiator station comprising one or more antennas; a memory; a processor; a radio; and a controller configured to cause the initiator station to process a first Fine Timing measurement (FTM) message received from a responder station, the first FTM message comprising a first field comprising a first Message Authentication Code (MAC); process a second FTM message comprising the first field, a second field, and an FTM time value corresponding to the first FTM message, the first field comprising a second MAC, and the second field comprising the first MAC; and determine whether or not to use the FTM time value for an FTM measurement, based on an authentication of the responder station according to the second MAC.

Example 23 includes the subject matter of Example 22, and optionally, wherein the initiator station is to determine whether or not to use location based information in the first FTM message, based on an authentication of the responder station according to the first MAC.

Example 24 includes the subject matter of Example 23, and optionally, wherein the location based information comprises at least one report selected from a group consisting of a location configuration information (LCI) report, and a CIVIC location report.

Example 25 includes the subject matter of any one of Examples 22-24, and optionally, wherein the initiator station is to determine whether or not to perform the FTM measurement, based on an authentication of the responder station according to the first MAC.

Example 26 includes the subject matter of any one of Examples 22-25, and optionally, wherein the initiator station is to use the FTM time value for the FTM measurement only if the authentication of the responder station according to the second MAC is successful.

Example 27 includes the subject matter of any one of Examples 22-26, and optionally, wherein the initiator station is to select not to use the FTM time value for the FTM measurement if the authentication of the responder station according to the second MAC is not successful.

Example 28 includes the subject matter of any one of Examples 22-27, and optionally, wherein the first MAC is based on a key and a first time value, and the second MAC is based on the key and a second time value.

Example 29 includes the subject matter of Example 28, and optionally, wherein the first and second time values are based on a Time Synchronization Function (TSF).

Example 30 includes the subject matter of Example 28 or 29, and optionally, wherein the key comprises a pre-shared key shared between the initiator station and the responder station.

Example 31 includes the subject matter of any one of Examples 28-30, and optionally, wherein the initiator station is to receive the key from a certified entity.

Example 32 includes the subject matter of any one of Examples 22-31, and optionally, wherein the second MAC is based on an address of the responder station.

Example 33 includes the subject matter of Example 32, and optionally, wherein the second MAC is based on an address of the initiator station.

Example 34 includes the subject matter of any one of Examples 22-33, and optionally, wherein the first MAC and the second MAC are based on a hash function.

Example 35 includes the subject matter of any one of Examples 22-34, and optionally, wherein the initiator station is to determine, based on the first MAC in the second field of the second FTM message, that the second FTM message follows the first FTM message.

Example 36 includes the subject matter of any one of Examples 22-35, and optionally, wherein the first field comprises a dialog token field, and the second field comprises a follow-up dialog token field.

Example 37 includes the subject matter of any one of Examples 22-36, and optionally, wherein the FTM time value comprises a Time of Departure (ToD) of the first FTM message.

Example 38 includes the subject matter of any one of Examples 22-37, and optionally, wherein the initiator station is to transmit an FTM request message to the responder station, the first FTM message is in response to the FTM request message.

Example 39 includes the subject matter of any one of Examples 22-38, and optionally, wherein the initiator station is to transmit an acknowledge (Ack) message to the responder station to acknowledge receipt of the first FTM message or the second FTM message.

Example 40 includes the subject matter of any one of Examples 22-39, and optionally, wherein the initiator station is to determine a range between the initiator station and the responder station, based on the FTM measurement.

Example 41 includes a method to be performed at an initiator station, the method comprising processing a first Fine Timing measurement (FTM) message received from a responder station, the first FTM message comprising a first field comprising a first Message Authentication Code (MAC); processing a second FTM message comprising the first field, a second field, and an FTM time value corresponding to the first FTM message, the first field comprising a second MAC, and the second field comprising the first MAC; and determining whether or not to use the FTM time value for an FTM measurement, based on an authentication of the responder station according to the second MAC.

Example 42 includes the subject matter of Example 41, and optionally, comprising determining whether or not to use location based information in the first FTM message, based on an authentication of the responder station according to the first MAC.

Example 43 includes the subject matter of Example 42, and optionally, wherein the location based information comprises at least one report selected from a group consisting of a location configuration information (LCI) report, and a CIVIC location report.

Example 44 includes the subject matter of any one of Examples 41-43, and optionally, comprising determining whether or not to perform the FTM measurement, based on an authentication of the responder station according to the first MAC.

Example 45 includes the subject matter of any one of Examples 41-44, and optionally, comprising using the FTM time value for the FTM measurement only if the authentication of the responder station according to the second MAC is successful.

Example 46 includes the subject matter of any one of Examples 41-45, and optionally, comprising selecting not to use the FTM time value for the FTM measurement if the authentication of the responder station according to the second MAC is not successful.

Example 47 includes the subject matter of any one of Examples 41-46, and optionally, wherein the first MAC is based on a key and a first time value, and the second MAC is based on the key and a second time value.

Example 48 includes the subject matter of Example 47, and optionally, wherein the first and second time values are based on a Time Synchronization Function (TSF).

Example 49 includes the subject matter of Example 47 or 48, and optionally, wherein the key comprises a pre-shared key shared between the initiator station and the responder station.

Example 50 includes the subject matter of any one of Examples 47-49, and optionally, comprising receiving the key from a certified entity.

Example 51 includes the subject matter of any one of Examples 41-50, and optionally, wherein the second MAC is based on an address of the responder station.

Example 52 includes the subject matter of Example 51, and optionally, wherein the second MAC is based on an address of the initiator station.

Example 53 includes the subject matter of any one of Examples 41-52, and optionally, wherein the first MAC and the second MAC are based on a hash function.

Example 54 includes the subject matter of any one of Examples 41-53, and optionally, comprising determining, based on the first MAC in the second field of the second FTM message, that the second FTM message follows the first FTM message.

Example 55 includes the subject matter of any one of Examples 41-54, and optionally, wherein the first field comprises a dialog token field, and the second field comprises a follow-up dialog token field.

Example 56 includes the subject matter of any one of Examples 41-55, and optionally, wherein the FTM time value comprises a Time of Departure (ToD) of the first FTM message.

Example 57 includes the subject matter of any one of Examples 41-56, and optionally, comprising transmitting an FTM request message to the responder station, the first FTM message is in response to the FTM request message.

Example 58 includes the subject matter of any one of Examples 41-57, and optionally, comprising transmitting an acknowledge (Ack) message to the responder station to acknowledge receipt of the first FTM message or the second FTM message.

Example 59 includes the subject matter of any one of Examples 41-58, and optionally, comprising determining a range between the initiator station and the responder station, based on the FTM measurement.

Example 60 includes a product including one or more tangible computer-readable non-transitory storage media comprising computer-executable instructions operable to, when executed by at least one computer processor, enable the at least one computer processor to implement operations at an initiator station, the operations comprising processing a first Fine Timing measurement (FTM) message received from a responder station, the first FTM message comprising a first field comprising a first Message Authentication Code (MAC); processing a second FTM message comprising the first field, a second field, and an FTM time value corresponding to the first FTM message, the first field comprising a second MAC, and the second field comprising the first MAC; and determining whether or not to use the FTM time value for an FTM measurement, based on an authentication of the responder station according to the second MAC.

Example 61 includes the subject matter of Example 60, and optionally, wherein the operations comprise determining whether or not to use location based information in the first FTM message, based on an authentication of the responder station according to the first MAC.

Example 62 includes the subject matter of Example 61, and optionally, wherein the location based information comprises at least one report selected from a group consisting of a location configuration information (LCI) report, and a CIVIC location report.

Example 63 includes the subject matter of any one of Examples 60-62, and optionally, wherein the operations comprise determining whether or not to perform the FTM measurement, based on an authentication of the responder station according to the first MAC.

Example 64 includes the subject matter of any one of Examples 60-63, and optionally, wherein the operations comprise using the FTM time value for the FTM measurement only if the authentication of the responder station according to the second MAC is successful.

Example 65 includes the subject matter of any one of Examples 60-64, and optionally, wherein the operations comprise selecting not to use the FTM time value for the FTM measurement if the authentication of the responder station according to the second MAC is not successful.

Example 66 includes the subject matter of any one of Examples 60-65, and optionally, wherein the first MAC is based on a key and a first time value, and the second MAC is based on the key and a second time value.

Example 67 includes the subject matter of Example 66, and optionally, wherein the first and second time values are based on a Time Synchronization Function (TSF).

Example 68 includes the subject matter of Example 66 or 67, and optionally, wherein the key comprises a pre-shared key shared between the initiator station and the responder station.

Example 69 includes the subject matter of any one of Examples 66-68, and optionally, wherein the operations comprise receiving the key from a certified entity.

Example 70 includes the subject matter of any one of Examples 60-69, and optionally, wherein the second MAC is based on an address of the responder station.

Example 71 includes the subject matter of Example 70, and optionally, wherein the second MAC is based on an address of the initiator station.

Example 72 includes the subject matter of any one of Examples 60-71, and optionally, wherein the first MAC and the second MAC are based on a hash function.

Example 73 includes the subject matter of any one of Examples 60-72, and optionally, wherein the operations comprise determining, based on the first MAC in the second field of the second FTM message, that the second FTM message follows the first FTM message.

Example 74 includes the subject matter of any one of Examples 60-73, and optionally, wherein the first field comprises a dialog token field, and the second field comprises a follow-up dialog token field.

Example 75 includes the subject matter of any one of Examples 60-74, and optionally, wherein the FTM time value comprises a Time of Departure (ToD) of the first FTM message.

Example 76 includes the subject matter of any one of Examples 60-75, and optionally, wherein the operations comprise transmitting an FTM request message to the responder station, the first FTM message is in response to the FTM request message.

Example 77 includes the subject matter of any one of Examples 60-76, and optionally, wherein the operations comprise transmitting an acknowledge (Ack) message to the responder station to acknowledge receipt of the first FTM message or the second FTM message.

Example 78 includes the subject matter of any one of Examples 60-77, and optionally, wherein the operations comprise determining a range between the initiator station and the responder station, based on the FTM measurement.

Example 79 includes an apparatus of wireless communication by an initiator station, the apparatus comprising means for processing a first Fine Timing measurement (FTM) message received from a responder station, the first FTM message comprising a first field comprising a first Message Authentication Code (MAC); means for processing a second FTM message comprising the first field, a second field, and an FTM time value corresponding to the first FTM message, the first field comprising a second MAC, and the second field comprising the first MAC; and means for determining whether or not to use the FTM time value for an FTM measurement, based on an authentication of the responder station according to the second MAC.

Example 80 includes the subject matter of Example 79, and optionally, comprising means for determining whether or not to use location based information in the first FTM message, based on an authentication of the responder station according to the first MAC.

Example 81 includes the subject matter of Example 80, and optionally, wherein the location based information comprises at least one report selected from a group consisting of a location configuration information (LCI) report, and a CIVIC location report.

Example 82 includes the subject matter of any one of Examples 79-81, and optionally, comprising means for determining whether or not to perform the FTM measurement, based on an authentication of the responder station according to the first MAC.

Example 83 includes the subject matter of any one of Examples 79-82, and optionally, comprising means for using the FTM time value for the FTM measurement only if the authentication of the responder station according to the second MAC is successful.

Example 84 includes the subject matter of any one of Examples 79-83, and optionally, comprising means for selecting not to use the FTM time value for the FTM measurement if the authentication of the responder station according to the second MAC is not successful.

Example 85 includes the subject matter of any one of Examples 79-84, and optionally, wherein the first MAC is based on a key and a first time value, and the second MAC is based on the key and a second time value.

Example 86 includes the subject matter of Example 85, and optionally, wherein the first and second time values are based on a Time Synchronization Function (TSF).

Example 87 includes the subject matter of Example 85 or 86, and optionally, wherein the key comprises a pre-shared key shared between the initiator station and the responder station.

Example 88 includes the subject matter of any one of Examples 85-87, and optionally, comprising means for receiving the key from a certified entity.

Example 89 includes the subject matter of any one of Examples 79-88, and optionally, wherein the second MAC is based on an address of the responder station.

Example 90 includes the subject matter of Example 89, and optionally, wherein the second MAC is based on an address of the initiator station.

Example 91 includes the subject matter of any one of Examples 79-90, and optionally, wherein the first MAC and the second MAC are based on a hash function.

Example 92 includes the subject matter of any one of Examples 79-91, and optionally, comprising means for determining, based on the first MAC in the second field of the second FTM message, that the second FTM message follows the first FTM message.

Example 93 includes the subject matter of any one of Examples 79-92, and optionally, wherein the first field comprises a dialog token field, and the second field comprises a follow-up dialog token field.

Example 94 includes the subject matter of any one of Examples 79-93, and optionally, wherein the FTM time value comprises a Time of Departure (ToD) of the first FTM message.

Example 95 includes the subject matter of any one of Examples 79-94, and optionally, comprising means for transmitting an FTM request message to the responder station, the first FTM message is in response to the FTM request message.

Example 96 includes the subject matter of any one of Examples 79-95, and optionally, comprising means for transmitting an acknowledge (Ack) message to the responder station to acknowledge receipt of the first FTM message or the second FTM message.

Example 97 includes the subject matter of any one of Examples 79-96, and optionally, comprising means for determining a range between the initiator station and the responder station, based on the FTM measurement.

Example 98 includes an apparatus comprising circuitry and logic configured to cause a responder station to transmit a first Fine Timing measurement (FTM) message to an initiator station, the first FTM message comprising a first field comprising a first Message Authentication Code (MAC); and transmit to the initiator station a second FTM message comprising the first field, a second field, and an FTM time value corresponding to the first FTM message, the first field comprising a second MAC, and the second field comprising the first MAC.

Example 99 includes the subject matter of Example 98, and optionally, wherein the apparatus is configured to cause the responder station to determine the first MAC based on a key and a first time value, and to determine the second MAC based on the key and a second time value.

Example 100 includes the subject matter of Example 99, and optionally, wherein the first and second time values are based on a Time Synchronization Function (TSF).

Example 101 includes the subject matter of Example 99 or 100, and optionally, wherein the key is a pre-shared key shared between the responder station and the initiator station.

Example 102 includes the subject matter of any one of Examples 99-101, and optionally, wherein the apparatus is configured to cause the responder station to receive the key from a certified entity.

Example 103 includes the subject matter of any one of Examples 98-102, and optionally, wherein the apparatus is configured to cause the responder station to determine the second MAC based on an address of the responder station.

Example 104 includes the subject matter of Example 103, and optionally, wherein the apparatus is configured to cause the responder station to determine the second MAC based on an address of the initiator station.

Example 105 includes the subject matter of any one of Examples 98-104, and optionally, wherein the apparatus is configured to cause the responder station to determine the first MAC and the second MAC based on a hash function.

Example 106 includes the subject matter of any one of Examples 98-105, and optionally, wherein the apparatus is configured to cause the responder station to set the first MAC in the second field of the second FTM message to indicate that the second FTM message follows the first FTM message.

Example 107 includes the subject matter of any one of Examples 98-106, and optionally, wherein the first field comprises a dialog token field, and the second field comprises a follow-up dialog token field.

Example 108 includes the subject matter of any one of Examples 98-107, and optionally, wherein the FTM time value comprises a Time of Departure (ToD) of the first FTM message.

Example 109 includes the subject matter of any one of Examples 98-108, and optionally, wherein the apparatus is configured to cause the responder station to process an FTM request message from the initiator station, and to transmit the first FTM message in response to the FTM request message.

Example 110 includes the subject matter of any one of Examples 98-109, and optionally, comprising a radio to transmit the first and second FTM messages.

Example 111 includes the subject matter of any one of Examples 98-110, and optionally, comprising one or more antennas, a memory, and a processor.

Example 112 includes a system of wireless communication comprising a responder station, the responder station comprising one or more antennas; a memory; a processor; a radio; and a controller configured to cause the responder station to transmit a first Fine Timing measurement (FTM)

message to an initiator station, the first FTM message comprising a first field comprising a first Message Authentication Code (MAC); and transmit to the initiator station a second FTM message comprising the first field, a second field, and an FTM time value corresponding to the first FTM message, the first field comprising a second MAC, and the second field comprising the first MAC.

Example 113 includes the subject matter of Example 112, and optionally, wherein the responder station is to determine the first MAC based on a key and a first time value, and to determine the second MAC based on the key and a second time value.

Example 114 includes the subject matter of Example 113, and optionally, wherein the first and second time values are based on a Time Synchronization Function (TSF).

Example 115 includes the subject matter of Example 113 or 114, and optionally, wherein the key is a pre-shared key shared between the responder station and the initiator station.

Example 116 includes the subject matter of any one of Examples 113-115, and optionally, wherein the responder station is to receive the key from a certified entity.

Example 117 includes the subject matter of any one of Examples 112-116, and optionally, wherein the responder station is to determine the second MAC based on an address of the responder station.

Example 118 includes the subject matter of Example 117, and optionally, wherein the responder station is to determine the second MAC based on an address of the initiator station.

Example 119 includes the subject matter of any one of Examples 112-118, and optionally, wherein the responder station is to determine the first MAC and the second MAC based on a hash function.

Example 120 includes the subject matter of any one of Examples 112-119, and optionally, wherein the responder station is to set the first MAC in the second field of the second FTM message to indicate that the second FTM message follows the first FTM message.

Example 121 includes the subject matter of any one of Examples 112-120, and optionally, wherein the first field comprises a dialog token field, and the second field comprises a follow-up dialog token field.

Example 122 includes the subject matter of any one of Examples 112-121, and optionally, wherein the FTM time value comprises a Time of Departure (ToD) of the first FTM message.

Example 123 includes the subject matter of any one of Examples 112-122, and optionally, wherein the responder station is to process an FTM request message from the initiator station, and to transmit the first FTM message in response to the FTM request message.

Example 124 includes a method to be performed at a responder station, the method comprising transmitting a first Fine Timing measurement (FTM) message to an initiator station, the first FTM message comprising a first field comprising a first Message Authentication Code (MAC); and transmitting to the initiator station a second FTM message comprising the first field, a second field, and an FTM time value corresponding to the first FTM message, the first field comprising a second MAC, and the second field comprising the first MAC.

Example 125 includes the subject matter of Example 124, and optionally, comprising determining the first MAC based on a key and a first time value, and determining the second MAC based on the key and a second time value.

Example 126 includes the subject matter of Example 125, and optionally, wherein the first and second time values are based on a Time Synchronization Function (TSF).

Example 127 includes the subject matter of Example 125 or 126, and optionally, wherein the key is a pre-shared key shared between the responder station and the initiator station.

Example 128 includes the subject matter of any one of Examples 125-127, and optionally, comprising receiving the key from a certified entity.

Example 129 includes the subject matter of any one of Examples 124-128, and optionally, comprising determining the second MAC based on an address of the responder station.

Example 130 includes the subject matter of Example 129, and optionally, comprising determining the second MAC based on an address of the initiator station.

Example 131 includes the subject matter of any one of Examples 124-130, and optionally, comprising determining the first MAC and the second MAC based on a hash function.

Example 132 includes the subject matter of any one of Examples 124-131, and optionally, comprising setting the first MAC in the second field of the second FTM message to indicate that the second FTM message follows the first FTM message.

Example 133 includes the subject matter of any one of Examples 124-132, and optionally, wherein the first field comprises a dialog token field, and the second field comprises a follow-up dialog token field.

Example 134 includes the subject matter of any one of Examples 124-133, and optionally, wherein the FTM time value comprises a Time of Departure (ToD) of the first FTM message.

Example 135 includes the subject matter of any one of Examples 124-134, and optionally, comprising processing an FTM request message from the initiator station, and transmitting the first FTM message in response to the FTM request message.

Example 136 includes a product including one or more tangible computer-readable non-transitory storage media comprising computer-executable instructions operable to, when executed by at least one computer processor, enable the at least one computer processor to implement operations at a responder station, the operations comprising transmitting a first Fine Timing measurement (FTM) message to an initiator station, the first FTM message comprising a first field comprising a first Message Authentication Code (MAC); and transmitting to the initiator station a second FTM message comprising the first field, a second field, and an FTM time value corresponding to the first FTM message, the first field comprising a second MAC, and the second field comprising the first MAC.

Example 137 includes the subject matter of Example 136, and optionally, wherein the operations comprise determining the first MAC based on a key and a first time value, and determining the second MAC based on the key and a second time value.

Example 138 includes the subject matter of Example 137, and optionally, wherein the first and second time values are based on a Time Synchronization Function (TSF).

Example 139 includes the subject matter of Example 137 or 138, and optionally, wherein the key is a pre-shared key shared between the responder station and the initiator station.

Example 140 includes the subject matter of any one of Examples 137-139, and optionally, wherein the operations comprise receiving the key from a certified entity.

Example 141 includes the subject matter of any one of Examples 136-140, and optionally, wherein the operations comprise determining the second MAC based on an address of the responder station.

Example 142 includes the subject matter of Example 141, and optionally, wherein the operations comprise determining the second MAC based on an address of the initiator station.

Example 143 includes the subject matter of any one of Examples 136-142, and optionally, wherein the operations comprise determining the first MAC and the second MAC based on a hash function.

Example 144 includes the subject matter of any one of Examples 136-143, and optionally, wherein the operations comprise setting the first MAC in the second field of the second FTM message to indicate that the second FTM message follows the first FTM message.

Example 145 includes the subject matter of any one of Examples 136-144, and optionally, wherein the first field comprises a dialog token field, and the second field comprises a follow-up dialog token field.

Example 146 includes the subject matter of any one of Examples 136-145, and optionally, wherein the FTM time value comprises a Time of Departure (ToD) of the first FTM message.

Example 147 includes the subject matter of any one of Examples 136-146, and optionally, wherein the operations comprise processing an FTM request message from the initiator station, and transmitting the first FTM message in response to the FTM request message.

Example 148 includes an apparatus of wireless communication by a responder station, the apparatus comprising means for transmitting a first Fine Timing measurement (FTM) message to an initiator station, the first FTM message comprising a first field comprising a first Message Authentication Code (MAC); and means for transmitting to the initiator station a second FTM message comprising the first field, a second field, and an FTM time value corresponding to the first FTM message, the first field comprising a second MAC, and the second field comprising the first MAC.

Example 149 includes the subject matter of Example 148, and optionally, comprising means for determining the first MAC based on a key and a first time value, and determining the second MAC based on the key and a second time value.

Example 150 includes the subject matter of Example 149, and optionally, wherein the first and second time values are based on a Time Synchronization Function (TSF).

Example 151 includes the subject matter of Example 149 or 150, and optionally, wherein the key is a pre-shared key shared between the responder station and the initiator station.

Example 152 includes the subject matter of any one of Examples 149-151, and optionally, comprising means for receiving the key from a certified entity.

Example 153 includes the subject matter of any one of Examples 148-152, and optionally, comprising means for determining the second MAC based on an address of the responder station.

Example 154 includes the subject matter of Example 153, and optionally, comprising means for determining the second MAC based on an address of the initiator station.

Example 155 includes the subject matter of any one of Examples 148-154, and optionally, comprising means for determining the first MAC and the second MAC based on a hash function.

Example 156 includes the subject matter of any one of Examples 148-155, and optionally, comprising means for setting the first MAC in the second field of the second FTM message to indicate that the second FTM message follows the first FTM message.

Example 157 includes the subject matter of any one of Examples 148-156, and optionally, wherein the first field comprises a dialog token field, and the second field comprises a follow-up dialog token field.

Example 158 includes the subject matter of any one of Examples 148-157, and optionally, wherein the FTM time value comprises a Time of Departure (ToD) of the first FTM message.

Example 159 includes the subject matter of any one of Examples 148-158, and optionally, comprising means for processing an FTM request message from the initiator station, and transmitting the first FTM message in response to the FTM request message.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause an initiator station to:

transmit a Fine Timing measurement (FTM) request to request to perform an FTM procedure with a responder station;

process a token field in a first FTM message received from the responder station, the token field in the first FTM message comprising a first Message Authentication Code (MAC);

process a token field and a follow-up token field in a second FTM message received from the responder station, the second FTM message comprising an FTM time value corresponding to a Time of Departure (ToD) of said first FTM message, the token field in the second FTM message comprising a second MAC, the follow-up token field in the second FTM message comprising said first MAC; and determine whether or not to use the FTM time value for an FTM measurement, based on an authentication of said responder station according to said second MAC.

2. The apparatus of claim 1 configured to cause the initiator station to determine whether or not to use location based information in the first FTM message, based on an authentication of said responder station according to said first MAC.

3. The apparatus of claim 2, wherein the location based information comprises at least one report selected from a group consisting of a location configuration information (LCI) report, and a CIVIC location report.

4. The apparatus of claim 1 configured to cause the initiator station to determine whether or not to perform said FTM measurement, based on an authentication of said responder station according to said first MAC.

5. The apparatus of claim 1 configured to cause the initiator station to use the FTM time value for the FTM measurement only if the authentication of said responder station according to said second MAC is successful.

6. The apparatus of claim 1 configured to cause the initiator station to select not to use the FTM time value for the FTM measurement if the authentication of said responder station according to said second MAC is not successful.

7. The apparatus of claim 1, wherein the first MAC is based on a key and a first time value, and the second MAC is based on the key and a second time value.

8. The apparatus of claim 7, wherein the first and second time values are based on a Time Synchronization Function (TSF).

9. The apparatus of claim 7, wherein the key comprises a pre-shared key shared between the initiator station and the responder station.

10. The apparatus of claim 1, wherein the second MAC is based on an address of said responder station.

11. The apparatus of claim 1 configured to cause the initiator station to determine, based on the first MAC in the follow-up token field of the second FTM message, that said second FTM message follows said first FTM message.

12. The apparatus of claim 1, wherein said second MAC is based on an address of said initiator station.

13. The apparatus of claim 1, wherein the first MAC and the second MAC are based on a hash function.

14. The apparatus of claim 1 configured to cause the initiator station to determine a range between said initiator station and said responder station, based on said FTM measurement.

15. The apparatus of claim 1 comprising a radio to receive the first and second FTM messages.

16. A product including one or more tangible computer-readable non-transitory storage media comprising computer-executable instructions operable to, when executed by at least one processor, enable the at least one processor to cause an initiator station to:
 transmit a Fine Timing measurement (FTM) request to request to perform an FTM procedure with a responder station;
 process a token field in a first FTM message received from the responder station, the token field in the first FTM message comprising a first Message Authentication Code (MAC);
 process a token field and a follow-up token field in a second FTM message received from the responder station, the second FTM message comprising an FTM time value corresponding to a Time of Departure (ToD) of said first FTM message, the token field in the second FTM message comprising a second MAC, the follow-up token field in the second FTM message comprising said first MAC; and
 determine whether or not to use the FTM time value for an FTM measurement, based on an authentication of said responder station according to said second MAC.

17. The product of claim 16, wherein the instructions, when executed, cause the initiator station to determine whether or not to use location based information in the first FTM message, based on an authentication of said responder station according to said first MAC.

18. An apparatus comprising circuitry and logic configured to cause a responder station to:
 receive from an initiator station a Fine Timing measurement (FTM) request to request to perform an FTM procedure with the responder station;
 transmit a first FTM message to the initiator station, the first FTM message comprising a token field comprising a first Message Authentication Code (MAC); and
 transmit to said initiator station a second FTM message comprising an FTM time value corresponding to a Time of Departure (ToD) of said first FTM message, a token field in the second FTM message comprising a second MAC, a follow-up token field in the second FTM message comprising said first MAC, the second MAC configured for authentication of the responder station for an FTM measurement based on the FTM time value.

19. The apparatus of claim 18 configured to cause the responder station to determine the first MAC based on a key and a first time value, and to determine the second MAC based on the key and a second time value.

20. The apparatus of claim 19, wherein the key is a pre-shared key shared between the responder station and the initiator station.

21. The apparatus of claim 19, wherein the first and second time values are based on a Time Synchronization Function (TSF).

22. The apparatus of claim 18 configured to cause the responder station to determine the second MAC based on an address of said responder station.

23. The apparatus of claim 18 comprising one or more antennas, a memory, and a processor.

24. A product including one or more tangible computer-readable non-transitory storage media comprising computer-executable instructions operable to, when executed by at least one processor, enable the at least one processor to cause a responder station to:
 receive from an initiator station a Fine Timing measurement (FTM) request to request to perform an FTM procedure with the responder station;
 transmit a first FTM message to the initiator station, the first FTM message comprising a token field comprising a first Message Authentication Code (MAC); and
 transmit to said initiator station a second FTM message comprising an FTM time value corresponding to a Time of Departure (ToD) of said first FTM message, a token field in the second FTM message comprising a second MAC, a follow-up token field in the second FTM message comprising said first MAC, the second MAC configured for authentication of the responder station for an FTM measurement based on the FTM time value.

25. The product of claim 24, wherein the first MAC is based on a key and a first time value, and the second MAC is based on the key and a second time value.

* * * * *